United States Patent
Broers et al.

(10) Patent No.: US 10,681,789 B2
(45) Date of Patent: Jun. 9, 2020

(54) ADAPTIVE LIGHTING BASED ON SKILL LEVEL

(71) Applicant: SIGNIFY HOLDING B.V., Eindhoven (NL)

(72) Inventors: Harry Broers, 'S-Hertogenbosch (NL); Ruben Rajagopalan, Neuss (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/321,062

(22) PCT Filed: Jul. 12, 2017

(86) PCT No.: PCT/EP2017/067549
§ 371 (c)(1),
(2) Date: Jan. 28, 2019

(87) PCT Pub. No.: WO2018/019590
PCT Pub. Date: Feb. 1, 2018

(65) Prior Publication Data
US 2019/0174607 A1   Jun. 6, 2019

(30) Foreign Application Priority Data

Jul. 28, 2016 (EP) .................................. 16181771

(51) Int. Cl.
*H05B 37/02* (2006.01)
*H05B 47/11* (2020.01)
*H05B 47/10* (2020.01)
*A63F 13/50* (2014.01)

(52) U.S. Cl.
CPC .............. *H05B 47/11* (2020.01); *A63F 13/50* (2014.09); *H05B 47/10* (2020.01); *A63F 2300/30* (2013.01); *A63F 2300/558* (2013.01)

(58) Field of Classification Search
CPC ............ H05B 37/0218; H05B 37/0227; H05B 37/0245; H05B 37/0272; H05B 37/0281
USPC ................................................... 315/307, 312
See application file for complete search history.

(56) References Cited

U.S. PATENT DOCUMENTS

| | | | |
|---|---|---|---|
| 6,016,038 A | 1/2000 | Mueller et al. | |
| 6,211,626 B1 | 4/2001 | Lys et al. | |
| 8,952,628 B1* | 2/2015 | Gordin ............... | H05B 37/0227 315/291 |
| 2003/0057884 A1 | 3/2003 | Dowling et al. | |
| 2012/0276507 A1 | 11/2012 | Taylor | |
| 2013/0147396 A1* | 6/2013 | Cook ..................... | H05B 47/19 315/312 |
| 2014/0211090 A1 | 7/2014 | Faratzis | |
| 2015/0283443 A1 | 10/2015 | Dunser | |
| 2015/0334807 A1* | 11/2015 | Gordin ............... | H05B 37/0218 315/152 |

(Continued)

*Primary Examiner* — Tung X Le
(74) *Attorney, Agent, or Firm* — Meenakshy Chakravorty

(57) ABSTRACT

Methods, systems, and apparatus are described herein for adjusting one or more lighting properties based on skill level of one or more players of a game. In various embodiments, (502) a skill disparity between at least two players of a game may be identified (502). A lighting scheme may be selected (504) to reduce an impact the skill disparity has on an outcome of the game. One or more light sources (104, 304) may be operated (508) to emit light in accordance with the lighting scheme.

12 Claims, 6 Drawing Sheets

(56) References Cited

U.S. PATENT DOCUMENTS

2016/0295658 A1* 10/2016 Chraibi .................. H05B 47/19
2017/0295625 A1* 10/2017 Lark, Jr. ............ H05B 33/0845

* cited by examiner

ADAPTIVE LIGHTING BASED ON SKILL LEVEL

CROSS-REFERENCE TO PRIOR APPLICATIONS

This application is the U.S. National Phase application under 35 U.S.C. § 371 of International Application No. PCT/EP2017/067549, filed on Jul. 12, 2017, which claims the benefit of European Patent Application No. 16181771.3, filed on Jul. 28, 2016. These applications are hereby incorporated by reference herein.

TECHNICAL FIELD

The present invention is directed generally to lighting control. More particularly, but not exclusively, various inventive methods and apparatus disclosed herein relate to adjusting one or more lighting properties based on skill level of one or more players of a game.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

It has long been known that light exerts powerful effects on the human brain and on well-being. Light is not only required for vision but also conveys a powerful stimulating signal for human alertness and cognition and has been routinely employed to improve performance and counter the negative impact of sleepiness or so-called "winter blues." The mechanisms underlying these positive effects of light still remain largely unknown. However, researchers have discovered a new type of light sensitive cell (photoreceptor) in the eye called melanopsin. This photoreceptor has been shown to be an essential component for relaying light information to a set of so-called "non-visual" centers in the brain. In the absence of this photoreceptor, animal research has shown that non-visual functions are disrupted, the biological clock becomes deregulated, and "free-runs" independent from the twenty-four hour day-night cycle become more common.

SUMMARY

The present disclosure is directed to inventive methods and apparatus for adjusting one or more lighting properties based on skill level of one or more players of a game. For example, one or more lights used to illuminate a court, field, or pitch on which a game is played may be operated to emit (or not emit) light having various properties selected to impair and/or enhance one or more players' performances.

In some embodiments in which a skill disparity is identified between two or more players of a game, a lighting scheme may be selected and implemented to reduce an impact the skill disparity has on an outcome of the game. In other embodiments, one or more ambient light sources may be operated to impair or enhance one or more players' abilities to play a game.

Generally, in one aspect, a method may include: identifying, by one or more processors, a skill disparity between at least two players of a game; selecting, by one or more of the processors, a lighting scheme to reduce an impact the skill disparity has on an outcome of the game; and operating, by one or more of the processors, one or more light sources to emit light in accordance with the lighting scheme.

In some embodiments, the method may include selecting, by one or more of the processors, the one or more light sources from a plurality of light sources based on positions of the at least two players relative to the plurality of light sources. In various versions, the one or more light sources may emit light towards a first player with a first level of skill that is different than a second level of skill associated with a second player. In various versions, the lighting scheme may include a property of emitted light selected to impair or enhance an ability of the first player to play the game. In various versions, the property of emitted light may include an intensity level such as a glare or dynamic lighting effect to distract the first player.

In various embodiments, one or more light sources may be used to demarcate a spatial boundary associated with the game. In some embodiments, the one or more light sources may be selected to alter one or more dimensions of a space demarcated by the spatial boundary. In some versions, the one or more light sources may be operated to alter one or more dimensions of a space demarcated by the spatial boundary, or to conceal the spatial boundary.

In various embodiments, the method may include continuously monitoring gameplay between the at least two players and selecting a new lighting scheme based on the continuous monitoring. In various embodiments, the one or more light sources may be integral with a moving object used to play the game.

In another aspect, a system may include: one or more light sources; and logic operably coupled with the one or more light sources. In various embodiments, the logic may be configured to: identify a skill level of at least one player of a game; select an ambient lighting scheme to alter an impact the skill level of the at least one player has on an outcome of the game; and operate the one or more light sources to emit light in accordance with the ambient lighting scheme.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

It has long been known that light exerts powerful effects on the human brain and on well-being. Light is not only required for vision but also conveys a powerful stimulating signal for human alertness and cognition and has been routinely employed to improve performance and counter the negative impact of sleepiness or so-called "winter blues." However, such techniques have not yet been leveraged to alter performance by one or more players of a game. In view of the foregoing, various embodiments and implementations of the present invention are directed to adjusting one or more lighting properties based on skill level of one or more players of a game. As used herein, a "game" may refer to any form of organized competition that may involve one or more players. Techniques described herein may be used to adjust light emitted to facilitate and/or illuminate the surroundings of any type of game, including but not limited to baseball, tennis, football, soccer, basketball, board games, billiards, table tennis (or "ping pong"), racquetball, squash, golf, video games, card games, bag toss, cricket, rugby, Australian rules football, volleyball, bowling, gymnastics, swimming, track and field, alpine sports, polo, water polo, competitive dancing, ice hockey, field hockey, golf, softball, badminton, hopscotch, four square, shuffleboard, darts, Jai alai, obstacle courses, and so forth.

Figure 1:
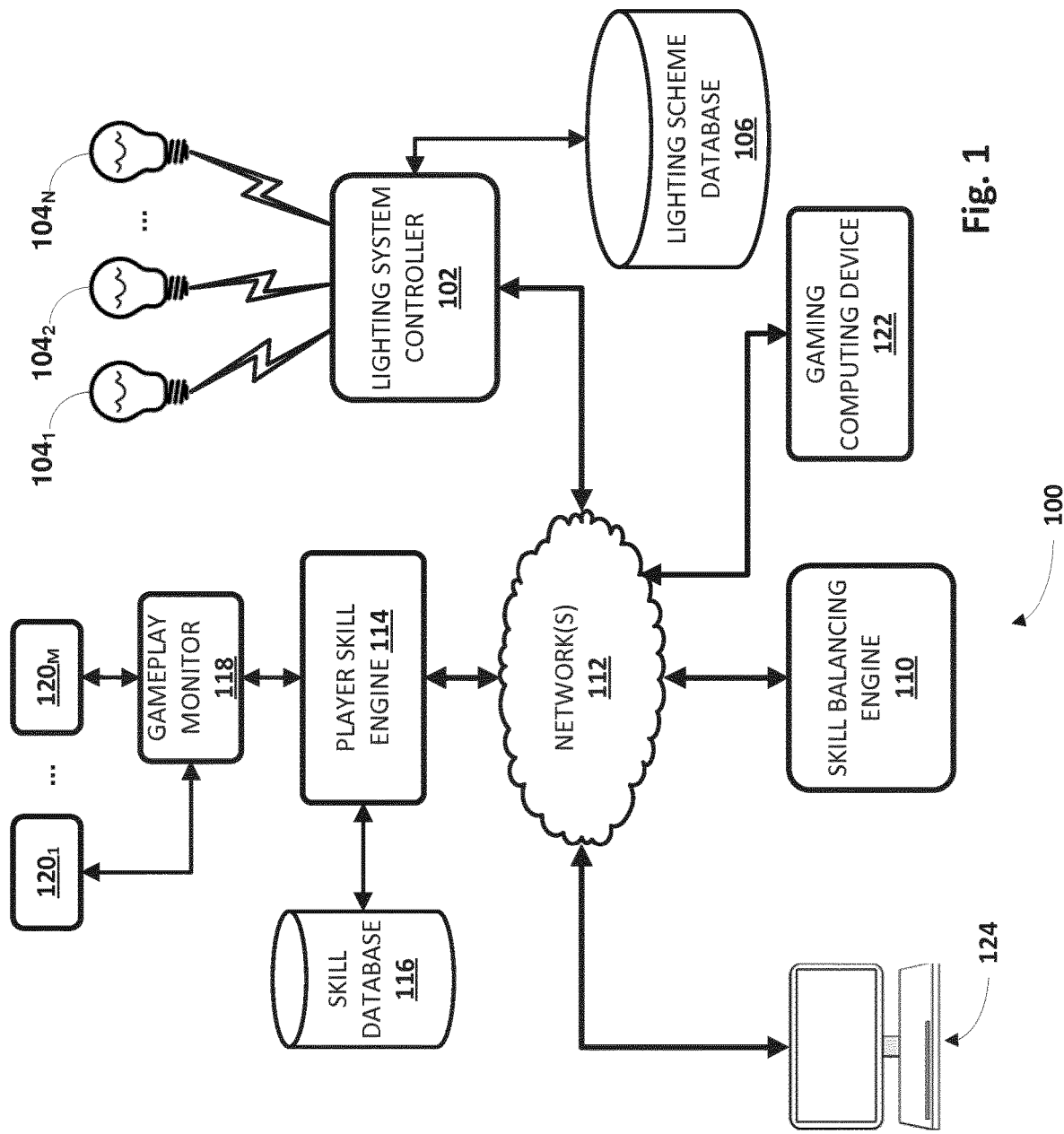
FIG. 1 schematically illustrates an example environment in which disclosed techniques may be practiced, in accordance with various embodiments.

Referring to FIG. 1, in one embodiment, an environment 100 in which disclosed techniques may be performed includes a lighting system controller 102 connected to one or more light sources $104_{1-N}$ via one or more wireless (depicted) or wired (not depicted) connections, such as ZigBee, Bluetooth, Wi-Fi, USB, direct electrical connection, etc. Lighting system controller 102 may be configured to operate light sources 104 to emit light having various selected properties, such as various intensity levels, colors, color temperatures, dynamic effects (e.g., blinking), glare, and so forth. Lighting system controller 102 may take various forms, such as one or more computing devices such as a smart hub, a component of a general purpose household computing device, and so forth. In some embodiments, one or more light sources 104 may be so-called "intelligent" light sources with logic (e.g., one or more microprocessors, ASICs, FPGAs, etc.) that implements lighting system controller 102. One or more light sources 104 may take various forms, such as LEDs, incandescents, halogen lamps, fluorescent lamps (including so-called compact fluorescent lamps, or "CFLs"), and so forth. In some embodiments, lighting system controller 102 may be operably coupled with a lighting scheme database 106, which may store various predefined and/or adjustable lighting schemes or "recipes," as well as other information such as a light source inventory (including addresses of individual light sources), and so forth.

Lighting system controller 102 may be communicatively coupled with a skill balancing engine 110 via one or more networks 112. One or more networks 112 may include, for instance, one or more personal area networks ("PANs"), local area networks ("LANs"), and/or one or more wide area networks ("WANs") such as the Internet. Skill balancing engine 110 may be communicatively coupled, e.g., via one or more networks 112, with a player skill engine 114. Skill balancing engine 110 and/or player skill engine 114 may each include and/or be operated on one or more computing devices, e.g., forming part of a so-called "cloud," that is configured to perform one or more operations described herein. In various embodiments, one or more components of FIG. 1, such as lighting system controller 102, skill balancing engine 110, and/or player skill engine 114 may be operated by the same computing device, may be combined into a single engine, and/or may be distributed in any number of ways.

Player skill engine 114 may be operably coupled with a player skill database 116 that includes records of skill levels of one or more players of one or more games. As a non-limiting example, player skill database 116 may store, in association with various players and various games, values such as numerical values, enumerated values such as "beginner," "intermediate," and "expert," and so forth. In some embodiments, player skill database 116 may store so-called "handicap" measures associated with players. The handicap measures may be indicative of skill levels of the associated players in a particular game.

In some embodiments, player skill engine 114 may be operably coupled with a gameplay monitor 118. Gameplay monitor 118 may take various forms, such as one or more processes operated by one or more computing systems. In various implementations, gameplay monitor 118 may be operably coupled with one or more sensors $120_{1-m}$, which may include, for instance, cameras, microphones, goal trackers, and so forth. The sensors 120 may be used to detect various player skills exhibited during gameplay (e.g., goals scored, pitch speed, serve speed, etc.). Based on signals from sensors 120, gameplay monitor 118 and/or player skill engine 114 may update player skill information, e.g., in player skill database 116, to more accurately reflect skill levels of various players.

Figure 2:
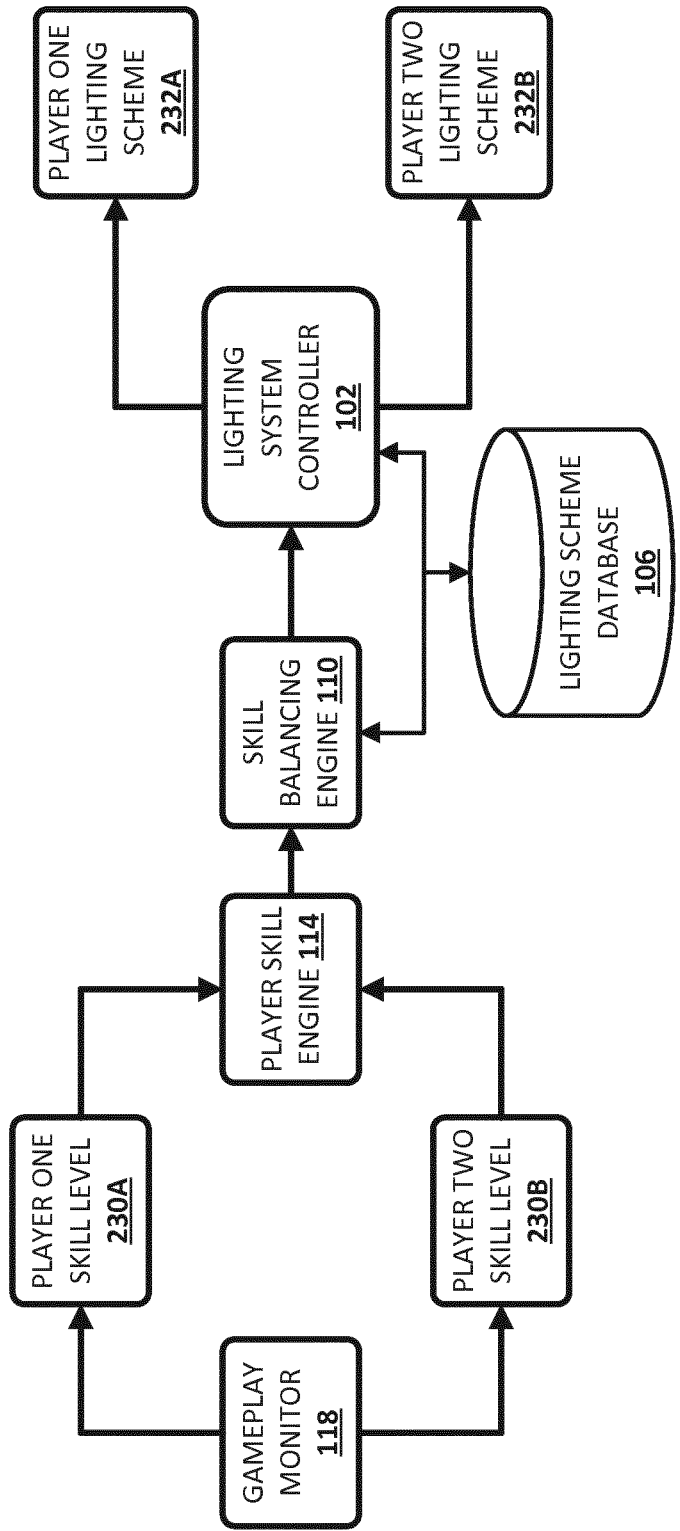
FIG. 2 depicts an example of how data may flow between various components of FIG. 1 when techniques described herein are implemented, in accordance with various embodiments.

Referring now to FIG. 2, in some embodiments in which multiple players are playing a game, gameplay monitor 118 may observe gameplay by the multiple players, e.g., using one or more sensors 120 (see FIG. 1). For example, gameplay monitor 118 may observe respective scores of two or more players over time. In some embodiments, gameplay monitor 118 may determine that one player should have a first handicap value, another player should have a second handicap value, and so forth. Gameplay monitor 118 may provide data indicative of observed skill levels (e.g., 230A and 230B) to player skill engine 114, e.g., for storage in player skill database 116. This player skill information may in turn be provided to skill balancing engine 110, e.g., by player skill engine 114.

Skill balancing engine 110 may be configured to identify, e.g., based on player skill data provided by player skill engine 114, a skill disparity between at least two players of a game. For example, one player of a game may have a skill level of "beginner," and another player may have a skill level of "advanced." Or the two or more players may have different handicap measures. Skill balancing engine 110 may compare the respective skill levels to determine a skill disparity.

Based on the skill disparity between two or more players, skill balancing engine 110 may select from database 106, or may cause lighting system controller 102 to select from database 106 one or more lighting schemes to reduce an impact the skill disparity has on an outcome of the game. Lighting system controller 102 may then operate one or more light sources 104 to emit light in accordance with the one or more selected lighting schemes, as indicated at 232A and 232B.

In some embodiments, gameplay monitor 118, player skill engine 114, and/or skill balancing engine 110 may provide a continuous feedback loop that monitors for effects lighting changes have on the game, and adjust accordingly. Suppose a selected and implemented lighting scheme turns the tide of the competition too much, e.g., giving a formerly outmatched player an overwhelming advantage. Based on data collected by gameplay monitor 118 and player skill engine 114, skill balancing engine 110 and/or lighting system controller 102 may select and implement a new lighting scheme for the previously-disadvantaged player and/or for the now-disadvantaged player to level the playing field once again. In some embodiments, new lighting schemes may be selected and implemented for one or more players until the players' are approximately equal, creating a more competitive and/or enjoyable experience.

Referring back to FIG. 1, in some embodiments, a gaming computing device 122 may be operably coupled with other components via one or more networks 112. Gaming computing device 122 may come in various forms, such as a desktop computer, a laptop, a tablet computer, a smart phone, a set top box, or a gaming console that may be coupled, for instance, to a television (not depicted). In various embodiments, when one or more players are operating gaming computing device 122 (or multiple gaming computing devices connected over one or more networks 112), one or more lighting schemes may be selected, e.g., from lighting scheme database 106 by skill balancing engine 110 and/or lighting system controller 102, to cause the performance of one or gamers to be enhanced or impaired, as desired.

For example, if a single gamer desires to increase the difficulty of a particular game, the gamer may indicate as much using an interface provided by a video game operated by gaming computing device 122. Gaming computing device 122 may in turn notify skill balancing engine 110 and/or lighting system controller 102. Skill balancing engine 110 and/or lighting system controller 102 may select and implement, e.g., on one or more ambient light sources 104, an ambient lighting scheme meant to improve and/or distract or otherwise impair the gamer's performance. For example, ambient light sources 104 in the room may be flashed, flickered, dimmed, brightened, and so forth.

In a multi-player gaming session, gaming computing device 122 may notify player skill engine 114 of perceived skill levels of the multiple gamers. Player skill engine 114 may store this information in skill database 116 and/or may in turn notify skill balancing engine 110. Skill balancing engine 110 and/or lighting system controller 102 may then select a lighting scheme for one or more players that attempts to decrease an impact of any detected skill disparity between the players. For example, ambient light sources 104 may be operated steadily and/or brightly for a less skilled player, e.g., to increase their cognitive abilities. Ambient light sources 104 may be operated unsteadily (e.g., blinking, flickering) or dimly for a more-skilled player, e.g., to decrease their cognitive abilities. In some embodiments, when multiple video gamers at multiple remote locations are playing a multi-player online game, ambient light sources 104 local to each player may be operated in a similar fashion.

General purpose computer 124 may take various forms, such as any of the above-mentioned form factors. In various embodiments, a user may operate general purpose computer 124 to manually provide skill levels and other similar information for one or more players. In some embodiments, a user may operate general purpose computer 124 to manually select, e.g., from lighting scheme database 106, one or more lighting schemes to implement for a particular contest. General purpose computer 124 may additionally or alternatively be operated by a user to provide feedback, e.g., to skill balancing engine 110, player skill engine 114, or even lighting system controller 102, about the suitability of automatically-selected lighting schemes. In this way, any of these components may be able to "learn" about whether selected lighting schemes were appropriate or not, and may be able to better select more suitable lighting schemes moving forward.

In some embodiments, one or more light sources 104 may be incorporated into a moving object that is used as part of gameplay, such as a tennis ball, football, basketball, shuttlecock, baseball, and so forth. In various embodiments, these light sources may be operated in accordance with various light schemes to increase and/or decrease difficulty of one or more players. For example, a tennis ball may be more brightly illuminated when travelling from a stronger player to a weaker player, and/or less brightly illuminated when travelling from a weaker player to a stronger player, so that the weaker player is provided with an advantage and/or the stronger player is provided with a disadvantage. In some embodiments, one or more light sources within the moving object and other light sources may emit similarly-colored light, e.g., to decrease the contrast between the moving object and the environment (e.g., so that a ball "blends in" with the environment for a more-skilled player).

Figure 3:
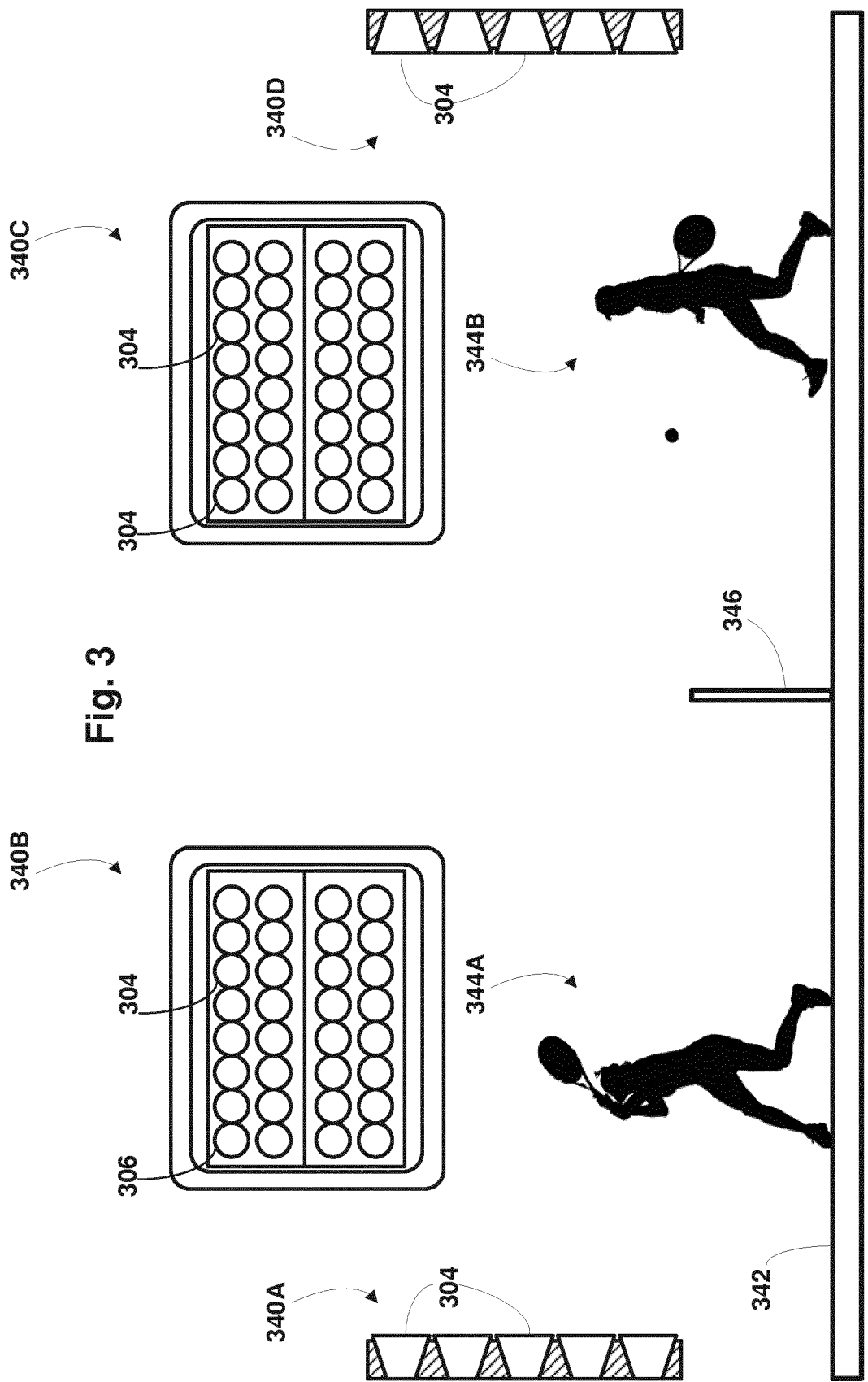
FIG. 3 and FIG. 4 depict example scenarios in which disclosed techniques may be practiced, in accordance with various embodiments.

In some embodiments, the one or more light sources 104 that will be used to implement a selected lighting scheme may be selected, e.g., by skill balancing engine 110 and/or lighting system controller 102, from a plurality of light sources $104_{1-N}$ based on positions of at least two players relative to plurality of light sources $104_{1-N}$. In FIG. 3, for instance, a plurality of stadium light assemblies 340A-D are depicted illuminating a tennis court 342. Each assembly includes a plurality of light sources 304, only a select few which have been indicated with reference numerals for the sakes of clarity and brevity. Two players, 344A and 344B, are depicted playing tennis under the stadium light assemblies 340A-D.

Suppose it is determined, e.g., by skill balancing engine 110 based on information obtained from player skill engine 114, that first player 344A is more skilled than second player 344B. Such a determination may be made, for instance, after gameplay monitor 118 observes first player 344A beating second player 344B the majority of the time. Additionally or alternatively, respective skill levels and/or handicap measures associated with first player 344A and second player 344B may be manually input into player skill database 116, e.g., using general purpose computer 124. Whichever the case, skill balancing engine 110 and/or lighting system controller 102 may select, e.g., from a plurality of lighting schemes stored in lighting scheme database 106, one or more lighting schemes that, when implemented by at least some of the light sources 304 of stadium light assemblies 340A-D, reduce an impact the skill disparity between first player 344A and second player 344B has on an outcome of the tennis match.

To attempt to close the skill gap between first player 344A and second player 344B, various actions may be taken to impair performance by first player 344A. For example, in FIG. 3, light sources 304 of fourth stadium light assembly 340D generally face the direction of first player 344A, who as noted above is the more skilled tennis player. Accordingly, one or more lighting schemes may be implemented to cause one or light sources 304 of fourth stadium light assembly 340D to emit, towards the first player 344A, light having one or more properties selected to impair performance by first player 344A. For example, in some embodiments, one or more light sources 304 of fourth stadium light assembly 340D may emit light having a high intensity or glare, which may partially blind or at least distract first player 344A. In other embodiments, one or more light sources 304 of fourth stadium light assembly 340D may emit light in a dynamic manner, e.g., blinking, flickering, etc., which again may distract or otherwise hinder performance of first player 344A.

In yet other embodiments, light sources 304 that generally illuminate the area of tennis court 342 occupied by first player 344A, such as light sources 304 of second stadium light assembly 340B and/or first stadium light assembly 340A, may be operated to impair performance of first player 344A. For example, light emitted by these light sources may be dimmed (which as noted above may decrease slightly the cognitive abilities of first player 344A), caused to blink or flicker, and so forth. In some embodiments, the glare/blinking/flickering may be timed to occur when a tennis ball is approaching first player 344A, although this is not required. In yet other embodiments, one or more light sources 304 that normally illuminate a portion of net 346 visible to first player 344A may be dimmed, e.g., so that first player 344A has more difficulty judging his or her shots.

In addition to or instead of impairing performance by one player, one or more lighting schemes may be selected to enhance performance by another player. In FIG. 3, for example, one or more light sources that illuminates an area of tennis court 342 occupied by second player 344B may have one or more lighting properties such as intensity increased, e.g., to generally improve a cognitive ability of second player 344B. Additionally or alternatively, one or more light sources 304 that normally illuminate a portion of net 346 visible to second player 344B may be brightened, e.g., so that second player 344B has less difficulty judging his or her shots.

Figure 4:
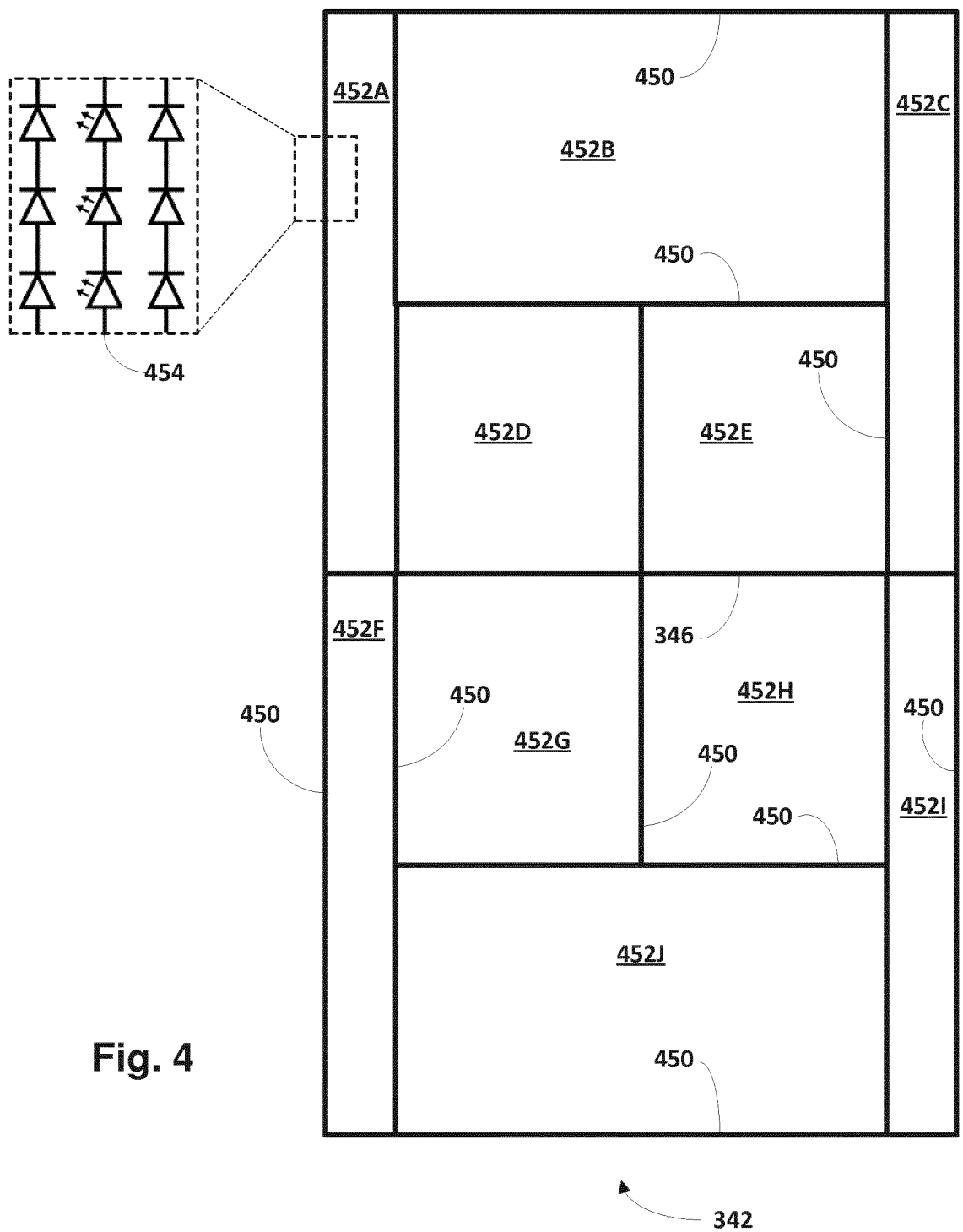

Light sources and lighting schemes may be employed in other ways than described above to impair and/or enhance one or more players' performances and/or reduce the impact a skill disparity has on an outcome of a game. FIG. 4 depicts an overhead view of tennis court 342. Various spatial boundaries 450 are provided to delineate a plurality of bounded spaces 452A-J that form part of the game of tennis. Most if not all spatial boundaries 450 of tennis court 342 may be created by illuminating one or more rows and/or columns of light sources that are, for instance, implanted in the ground (e.g., so that they are flush with the surface). For example, a whole two-dimensional array of light sources may be arranged under a glass court, and subsets of these lights may be energized to form spatial boundaries for any number of games besides tennis, such as basketball, hockey, indoor soccer, and so forth. In some embodiments, spatial boundaries 450 may be created by operating above-ground lights sources to project light onto the surface, in addition to or instead of creating spatial boundaries using light sources embedded in the ground.

As is shown in the blown up portion 454, in some embodiments, each spatial boundary 450 may be created using one or more light sources in the form of LEDs. The blown up portion 454 illustrates three parallel strings of LEDs. Only LEDs in the middle string are energized to emit light. LEDs of the strings on either side of the middle string are not energized to emit light. The middle string of LEDs may be energized to create the blown up spatial boundary 450 of the tennis court. However, in various embodiments, one of the other strings of LEDs may be selectively energized using techniques described herein, and/or the middle string may no longer be energized, to alter a position of the spatial boundary. Thus, for instance, a space 452A bounded by the spatial boundary 450 may be increased or decreased in size slightly, making it easier or harder for an opposing player to hit a tennis ball inbounds.

In some embodiments, techniques described above may be combined. For example, when two tennis players of disparate skill play on tennis court, the spatial boundaries on one side or the other (or both) may be altered to give the less-skilled player a competitive advantage. At the same time, lights facing the more-skilled player may be illuminated in accordance with lighting schemes that distract, partially blind, or otherwise impair the more-skilled player.

While the examples of FIGS. 3 and 4 depict how disclosed techniques may be implemented on a tennis court 342, disclosed techniques may be implemented on any other type of court as well. For example, spatial boundaries of a basketball court could be altered to give one team or another, or even individual players, an advantage or disadvantage. For example, a plurality of lights may be selected to demarcate a slightly shorter three-point line for a less-skilled team, or even for a specific player when it is determined that the specific player has the ball. Similarly, out-of-bounds lines, foul-shooting lines, and other lines may be shifted and/or even concealed to provide advantages or disadvantages as desired. Additionally or alternatively, in some racing competitions such as track and field, horse racing, auto racing, and so forth, spatial boundaries may demarcate a finish line for one or more competitors. In some embodiments, a finish line for one player may be adjusted based on their handicap measure (or based on other racers' handicap measures) to make the race more competitive.

In addition, and as alluded to above when describing gaming computing device 122, in various embodiments, techniques described herein may be implemented in a single-player game. In some embodiments, athletes may utilize lighting systems and other components configured with selected aspects of the present disclosure to train. For example, a training tennis player may practice her serve on a tennis court with lighting-created spatial boundaries that may be altered as described above to decrease or increase difficulty. Similarly, a training basketball player may practice free throws or three point shots on a basketball court with lighting-created foul lines and/or three-point lines. In some embodiments, as a training competitor increases his or her skill level, ambient or other lighting may be adjusted using techniques described herein to gradually increase the difficulty of the training, e.g., so that the training competitor may improve his or her skills.

Figure 5:
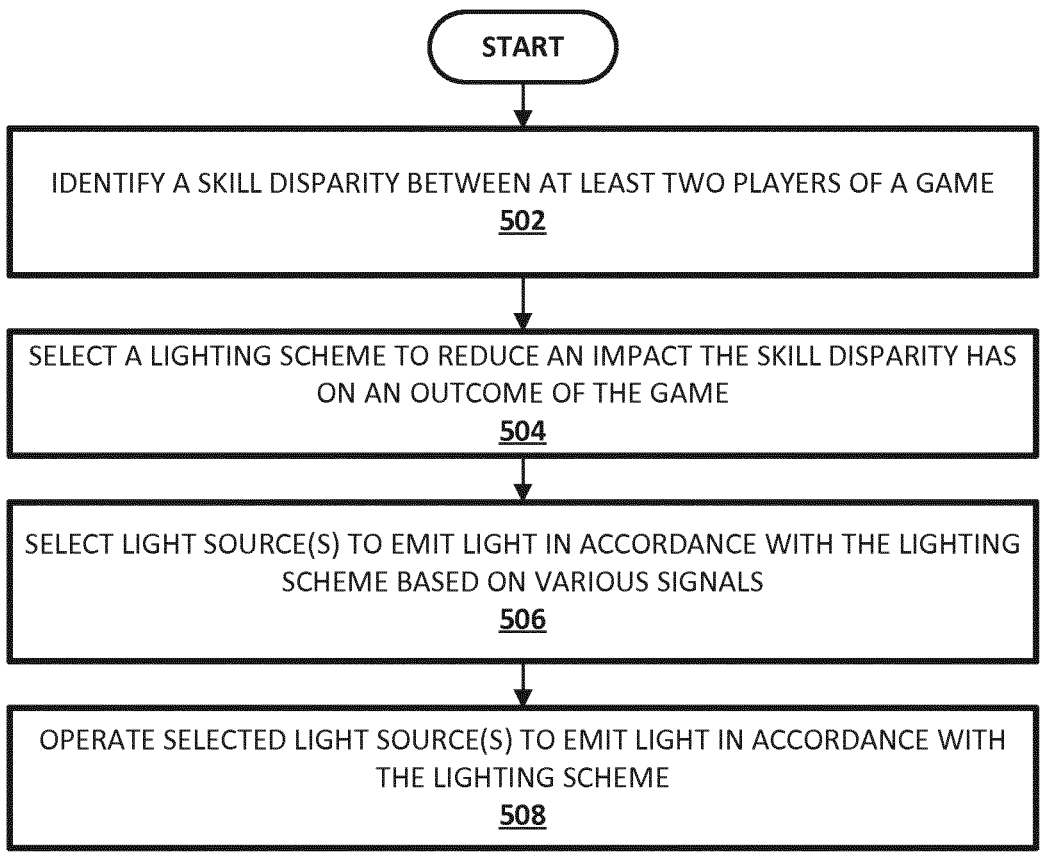
FIG. 5 depicts an example method in accordance with various embodiments.

FIG. 5 depicts an example method 500 of practicing various aspects of the present disclosure. While operations of method 500 are depicted in a particular order, this is not meant to be limiting. In various embodiments, various operations may be reordered, added, or omitted. At block 502, a skill disparity between at least two players of a game may be identified, e.g., by skill balancing engine 110 and/or player skill engine 114. As noted above, the skill disparity may be identified in various ways. In some embodiments, the skill disparity may be identified from records stored in player skill database 116. In some embodiments, the skill disparity may be identified based on signals received by gameplay monitor 118 from one or more sensors 120 observing gameplay between two or more players. As noted above, player skill may be denoted in a variety ways. In some embodiments, player skill may be quantified numerically, e.g., in a range (e.g., 0-100) or as a handicap measure. In some embodiments a player skill may be represented as one of a list of enumerated skill levels, such as "beginner," "intermediate," "advanced," "expert," and so forth.

At block 504, a lighting scheme may be selected, e.g., from lighting scheme database 106 by skill balancing engine 110 and/or lighting system controller 102, to reduce an impact the skill disparity identified at block 502 has on an outcome of a game. Various example lighting schemes are described above, and may include lighting schemes selected to distract, impair, improve, temporarily blind, or otherwise affect one or more players of the game. Additionally or alternatively, one or more spatial boundaries on a floor surface such as a court, or even on a non-horizontal surface (e.g., a racquetball court wall, a square on a basketball goal, rings on a dart board, etc.) may be altered to give one or more players an advantage or disadvantage. In a video game context, a lighting scheme may be selected to affect ambient light normally used to illuminate a room to impact a video gamer's performance.

At block 506, one or more light sources (e.g., 104) may be selected, e.g., from a plurality of available light sources, for implementation of the lighting scheme selected at block 504. For example, light sources that will impact one or more particular players positioned in a particular area (e.g., one side of a tennis/volleyball/badminton court) may be selected to impact players in that particular area. Additionally or alternatively, light sources that are operated to demarcate one or spatial boundaries for one or more players in a particular area may be selected, e.g., so that they can be operated to increase/decrease inbounds area, etc. In some embodiments, a lighting scheme may be inseparable from particular light sources on which it is to be implemented, in which case block 506 may be omitted.

At block 508, the light source(s) selected at block 506 may be operated in accordance with the lighting scheme selected at block 504. Various examples of how lighting schemes may be implemented on light sources to reduce an impact a skill disparity has on an outcome of a game are described above, but are not meant to be limiting.

Figure 6:
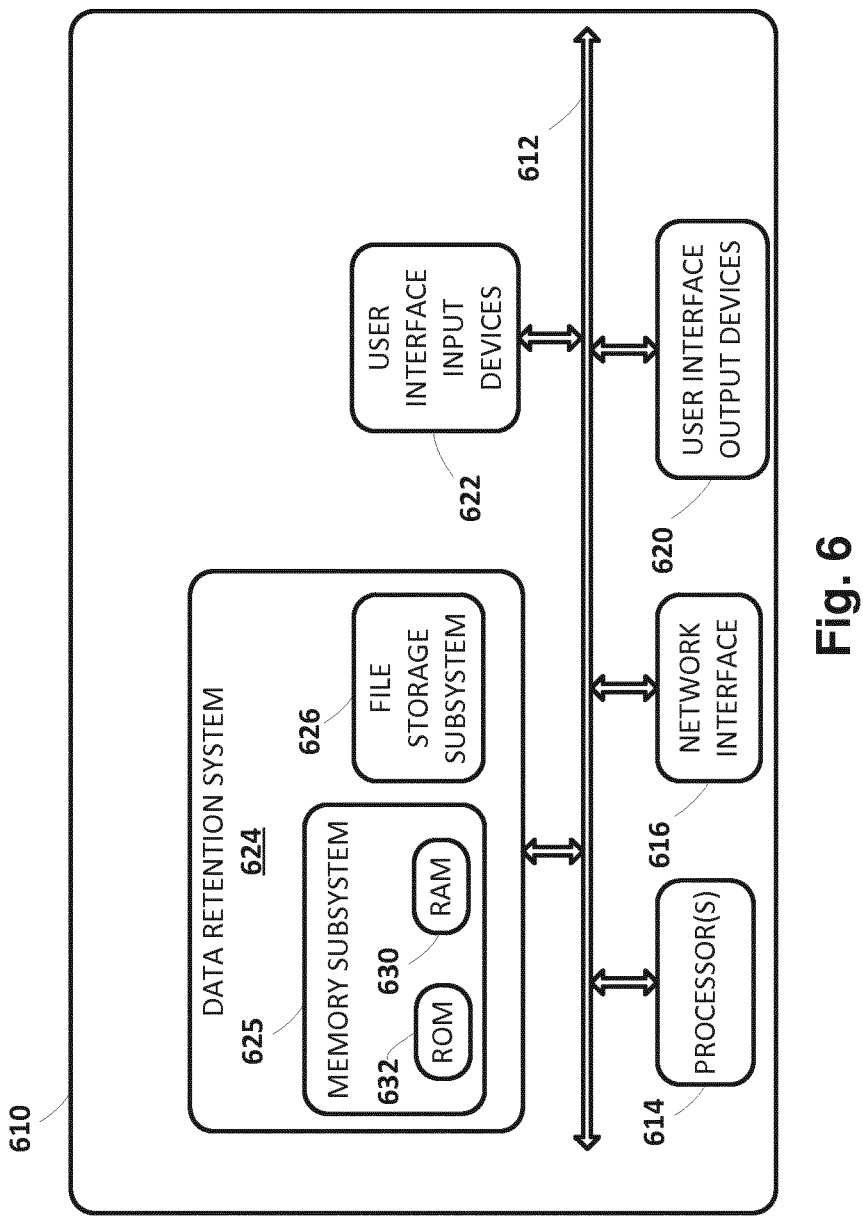
FIG. 6 schematically depicts example components of a computing system.

FIG. 6 is a block diagram of an example computer system 610. Computer system 610 typically includes at least one processor 614 which communicates with a number of peripheral devices via bus subsystem 612. As used herein, the term "processor" will be understood to encompass various devices capable of performing the various functionalities attributed to various components described herein such as, for example, microprocessors, FPGAs, ASICs, other similar devices, and combinations thereof. These peripheral devices may include a data retention subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Data retention system 624 stores programming and data constructs that provide the functionality of some or all of the modules described herein. For example, the data retention system 624 may include the logic to perform selected aspects of method 500, and/or to implement one or more engines or modules depicted in FIG. 1.

These software modules are generally executed by processor 614 alone or in combination with other processors. Memory 625 used in the storage subsystem can include a number of memories including a main random access memory (RAM) 630 for storage of instructions and data during program execution, a read only memory (ROM) 632 in which fixed instructions are stored, and other types of memories such as instruction/data caches (which may additionally or alternatively be integral with at least one processor 614). A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the data retention system 624, or in other machines accessible by the processor(s) 614. As used herein, the term "non-transitory computer-readable medium" will be understood to encompass both volatile memory (e.g. DRAM and SRAM) and non-volatile memory (e.g. flash memory, magnetic storage, and optical storage) but to exclude transitory signals.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. In some embodiments, computer system 610 may be implemented within a cloud computing environment. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

The invention claimed is:

1. A computer-implemented method, comprising:
   identifying, by one or more processors, a skill disparity between at least two players of a game based on player skill data provided by a player skill engine;
   selecting, based on the skill disparity between the at least two players, by the one or more processors, an ambient lighting scheme from a database to reduce an impact the skill disparity has on an outcome of the game, wherein the ambient lighting scheme comprises a property of emitted light selected to impair or enhance an ability of a first player of the at least two players to play the game;
   selecting, by the one or more of processors, one or more ambient light sources from a plurality of ambient light sources based on positions of the at least two players relative to the plurality of ambient light sources; and
   operating, by the one or more processors, the one or more ambient light sources to emit ambient light in accordance with the ambient lighting scheme.

2. The method of claim 1, wherein the one or more light sources emit light towards the first player with a first level of skill that is different than a second level of skill associated with a second player.

3. The method of claim 2, wherein the property of emitted light comprises an intensity level.

4. The method of claim 2, wherein the property of emitted light comprises a glare or dynamic lighting effect to distract the first player.

5. The method of claim 1, wherein the one or more light sources are additionally used to demarcate a spatial boundary associated with the game.

6. The method of claim 5, wherein the one or more light sources are additionally selected to alter one or more dimensions of a space demarcated by the spatial boundary.

7. The method of claim 5, wherein the one or more light sources are operated to additionally alter one or more dimensions of a space demarcated by the spatial boundary, or to conceal the spatial boundary.

8. The method of claim 1, further comprising continuously monitoring gameplay between the at least two players and selecting a new lighting scheme based on the continuous monitoring.

9. The method of claim 1, wherein the one or more light sources are integral with a moving object used to play the game.

10. A system comprising:
    a plurality of ambient light sources; and
    logic circuitry operably coupled with the plurality of ambient light sources, wherein the logic is configured to:
    identify a skill disparity between at least two players of a game based on player skill data provided by a player skill engine;
    select, based on the skill disparity between the at least two players, an ambient lighting scheme from a database to reduce an impact the skill disparity has on an outcome of the game, wherein the ambient lighting scheme comprises a property of emitted light selected to impair or enhance an ability of a first player of the at least two players to play the game;
    select, one or more ambient light sources from the plurality of ambient light sources based on positions of the at least two players relative to the plurality of ambient light sources; and operate the one or more ambient light sources to emit light in accordance with the ambient lighting scheme.

11. The system of claim 10, further comprising a gaming computing device operably coupled with the logic circuitry, wherein the game comprises a video game operated by the gaming computing device, and the logic circuitry identifies the skill disparity between the at least two players based on data obtained from the gaming computing device.

12. The system of claim 10, wherein the at least two players are distributed across a plurality of remote locations, and the plurality of ambient light sources comprise at least one ambient light source at each of the plurality of remote locations.

\* \* \* \* \*